H. D. HODGE.
CARTRIDGE MAKING MACHINE.
APPLICATION FILED JAN. 21, 1913.
1,073,127.
Patented Sept. 16, 1913.
7 SHEETS—SHEET 2.
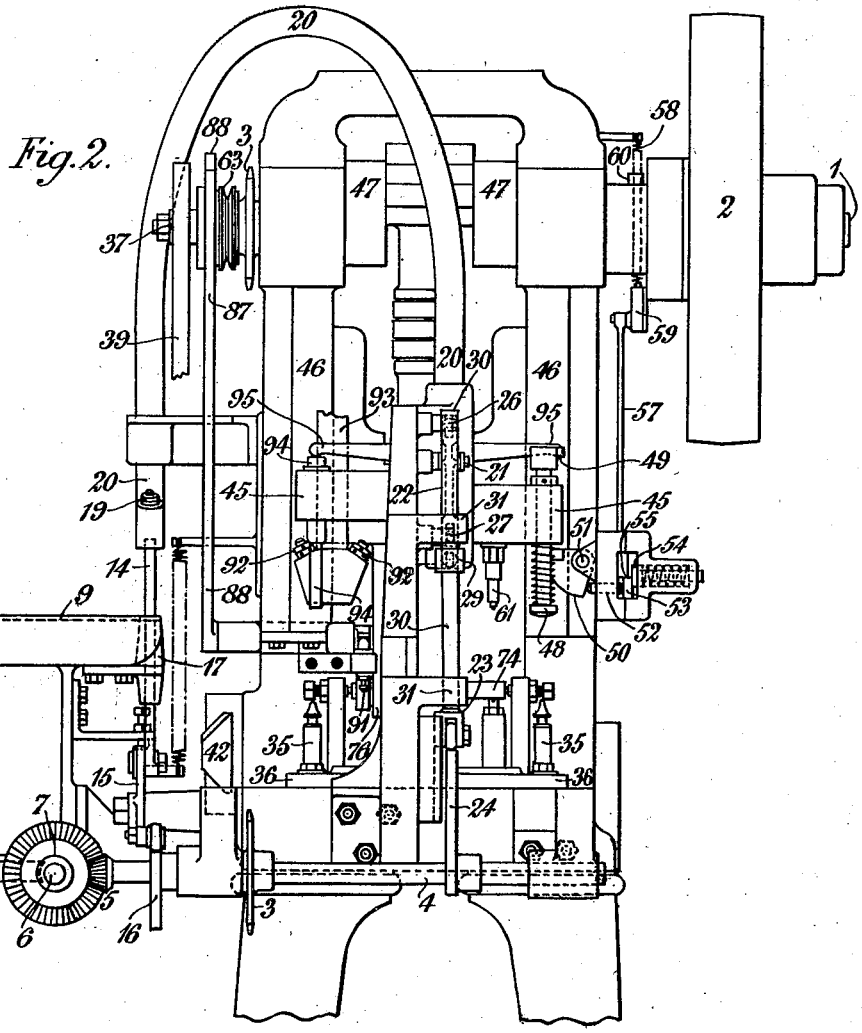
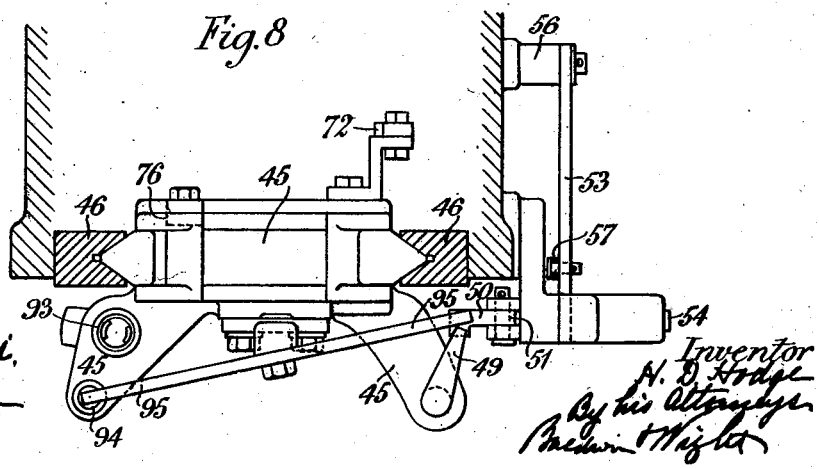

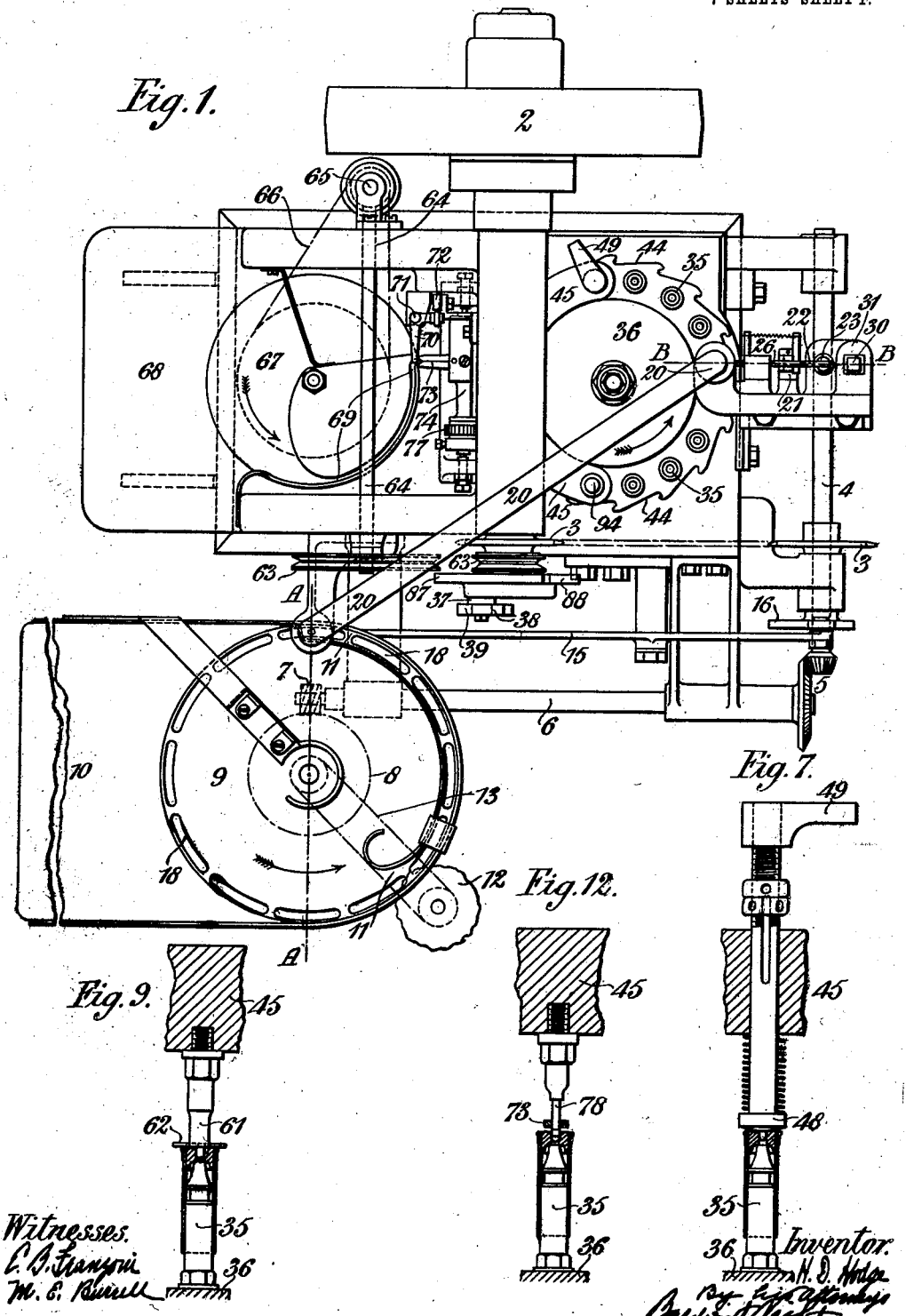

H. D. HODGE.
CARTRIDGE MAKING MACHINE.
APPLICATION FILED JAN. 21, 1913.

1,073,127.

Patented Sept. 16, 1913.
7 SHEETS—SHEET 3.

Witnesses

Inventor
H. D. Hodge
By his Attorney
Baldwin Wright

H. D. HODGE.
CARTRIDGE MAKING MACHINE.
APPLICATION FILED JAN. 21, 1913.

1,073,127.

Patented Sept. 16, 1913.
7 SHEETS—SHEET 4.

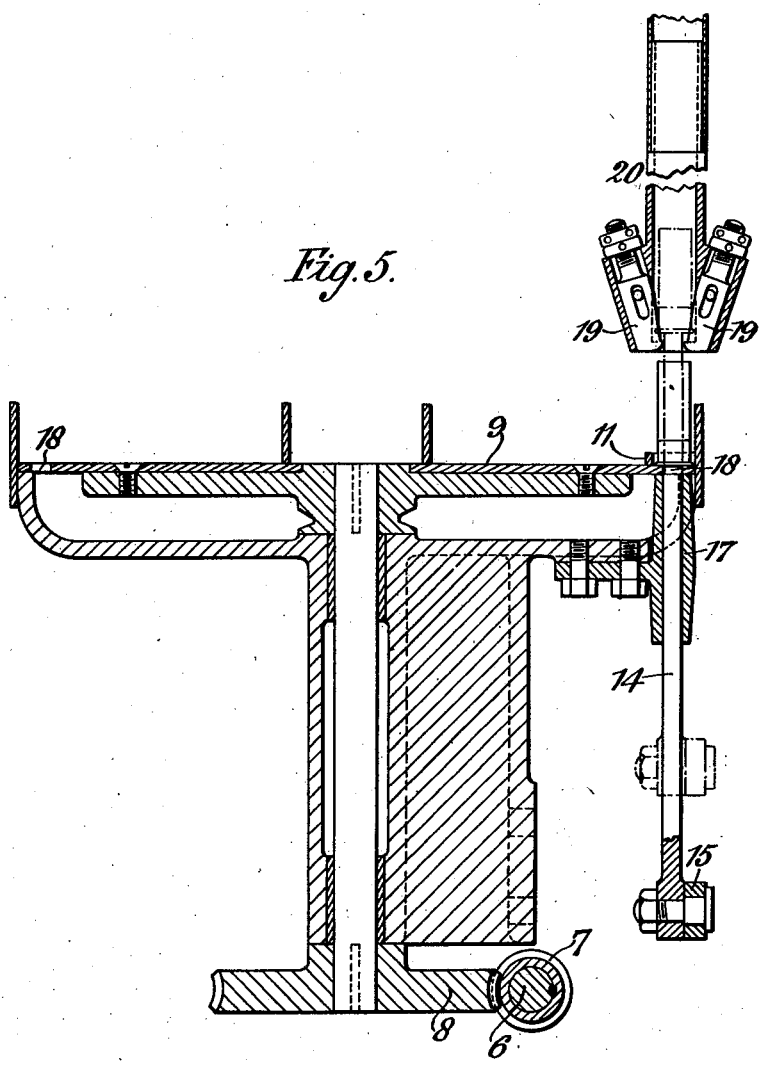

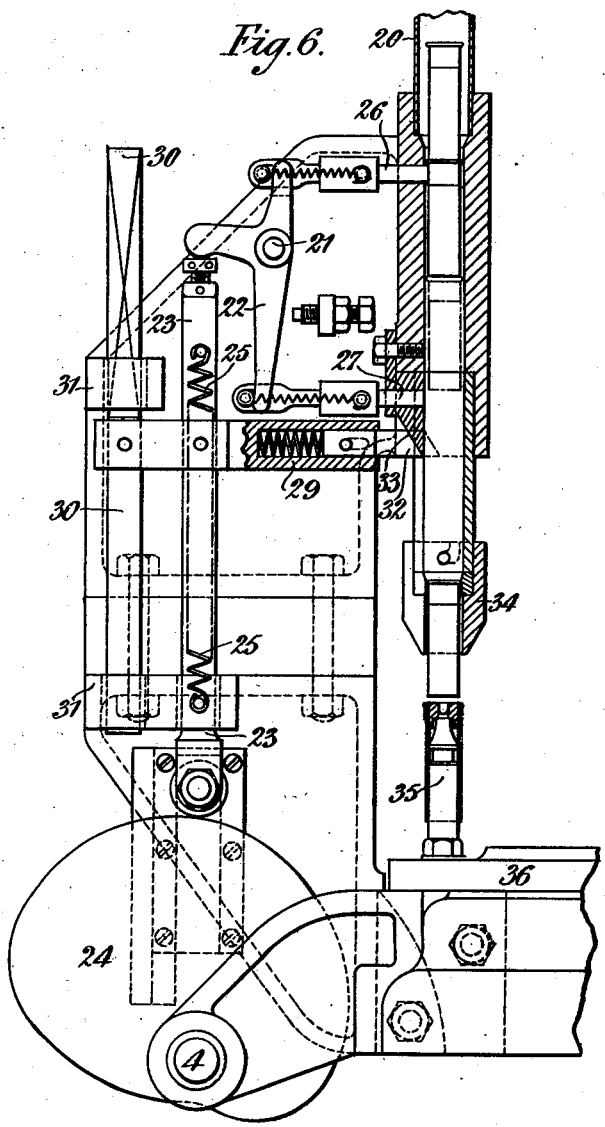

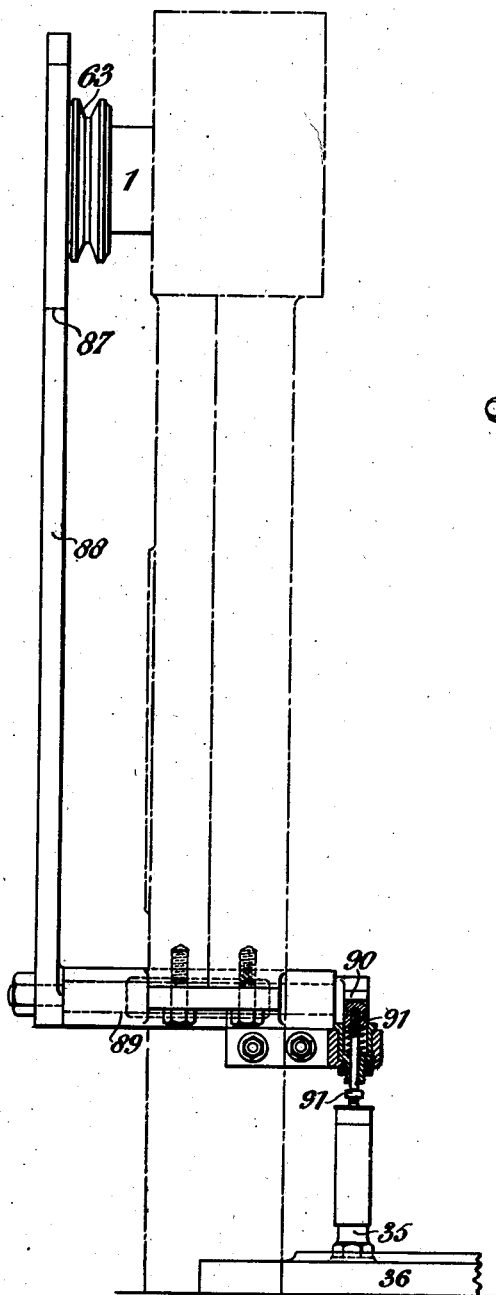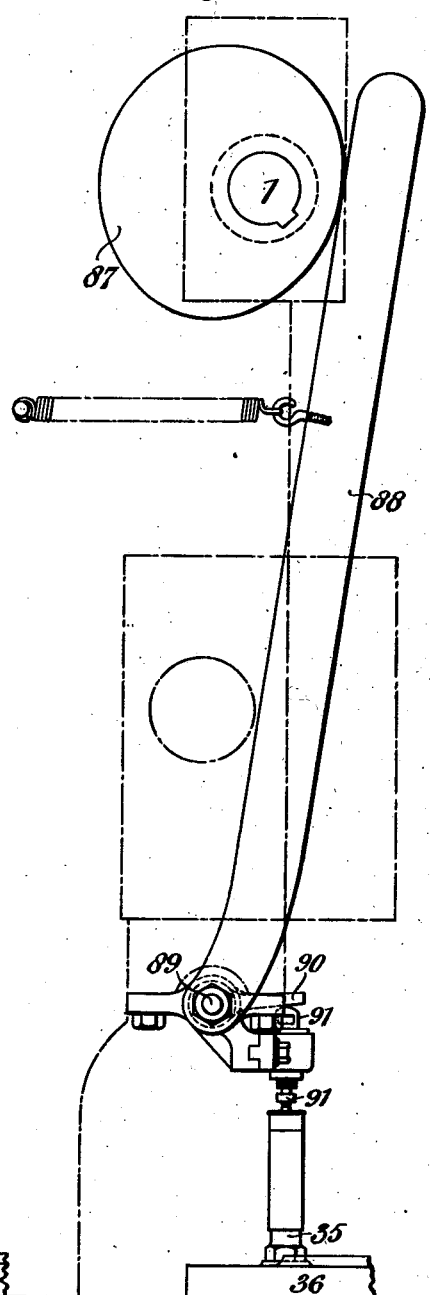

UNITED STATES PATENT OFFICE.

HOWARD DOUGLAS HODGE, OF WALTHAM ABBEY, ENGLAND, ASSIGNOR TO NOBEL'S EXPLOSIVES COMPANY, LIMITED, OF GLASGOW, SCOTLAND.

CARTRIDGE-MAKING MACHINE.

1,073,127.

Specification of Letters Patent.

Patented Sept. 16, 1913.

Application filed January 21, 1913. Serial No. 743,891.

*To all whom it may concern:*

Be it known that I, HOWARD DOUGLAS HODGE, a citizen of the United States, residing at Joyce House, Waltham Abbey, Essex, England, have invented new and useful Improvements in Cartridge-Making Machines, of which the following is a specification.

The object of this invention is to provide an improved machine for inserting primers into and gaging the heads of cartridge cases and in order that the invention may be the more readily understood I will at once describe it in connection with the accompanying drawings.

Figure 3:
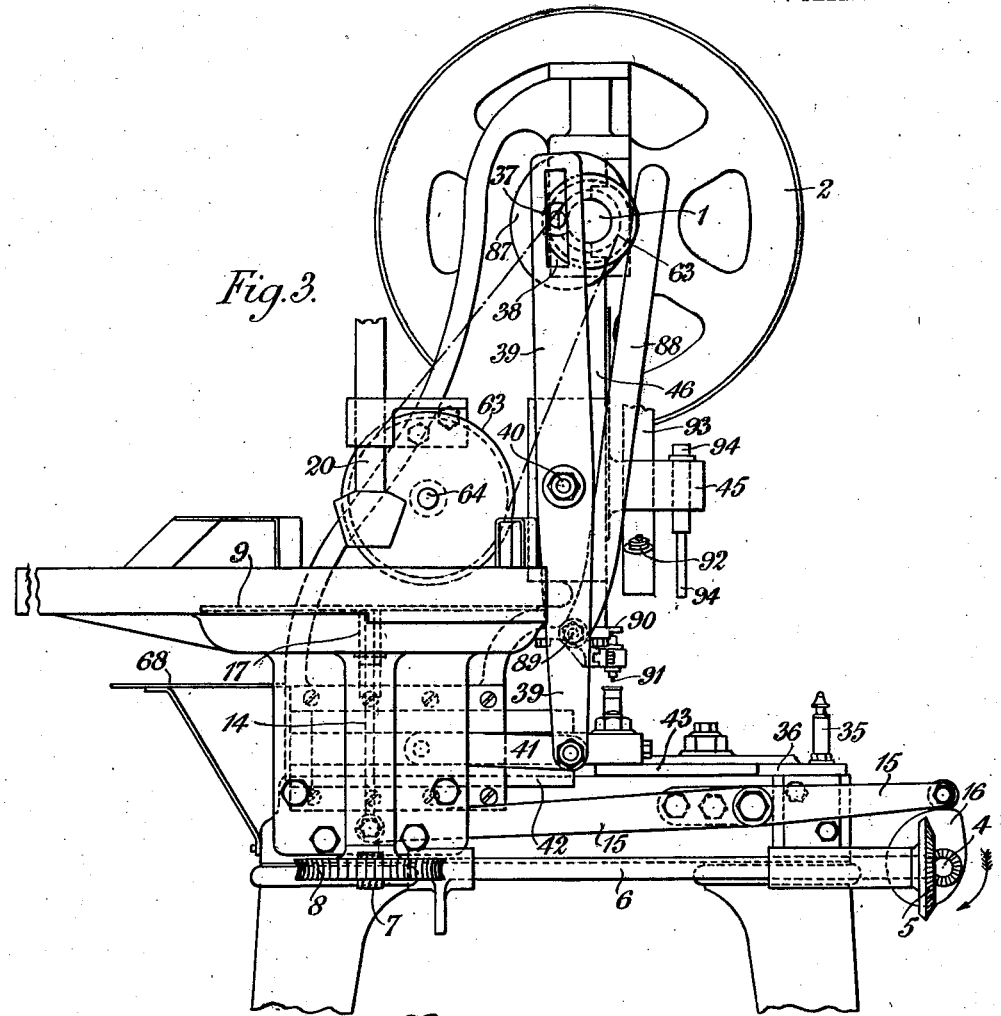
Figure 10:
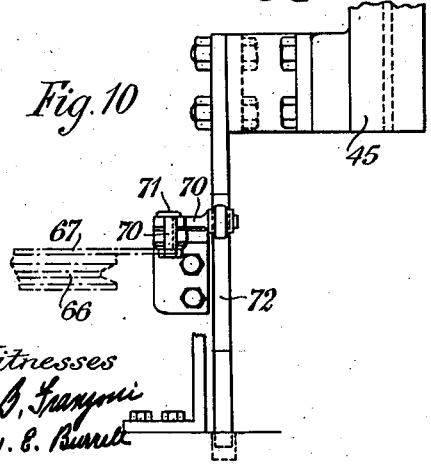
Figure 11:
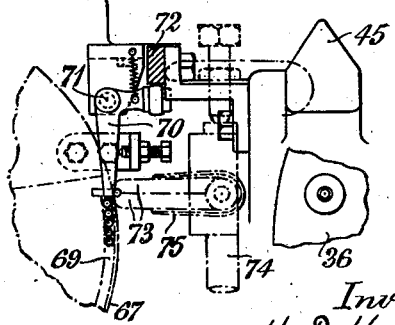
Figure 4:
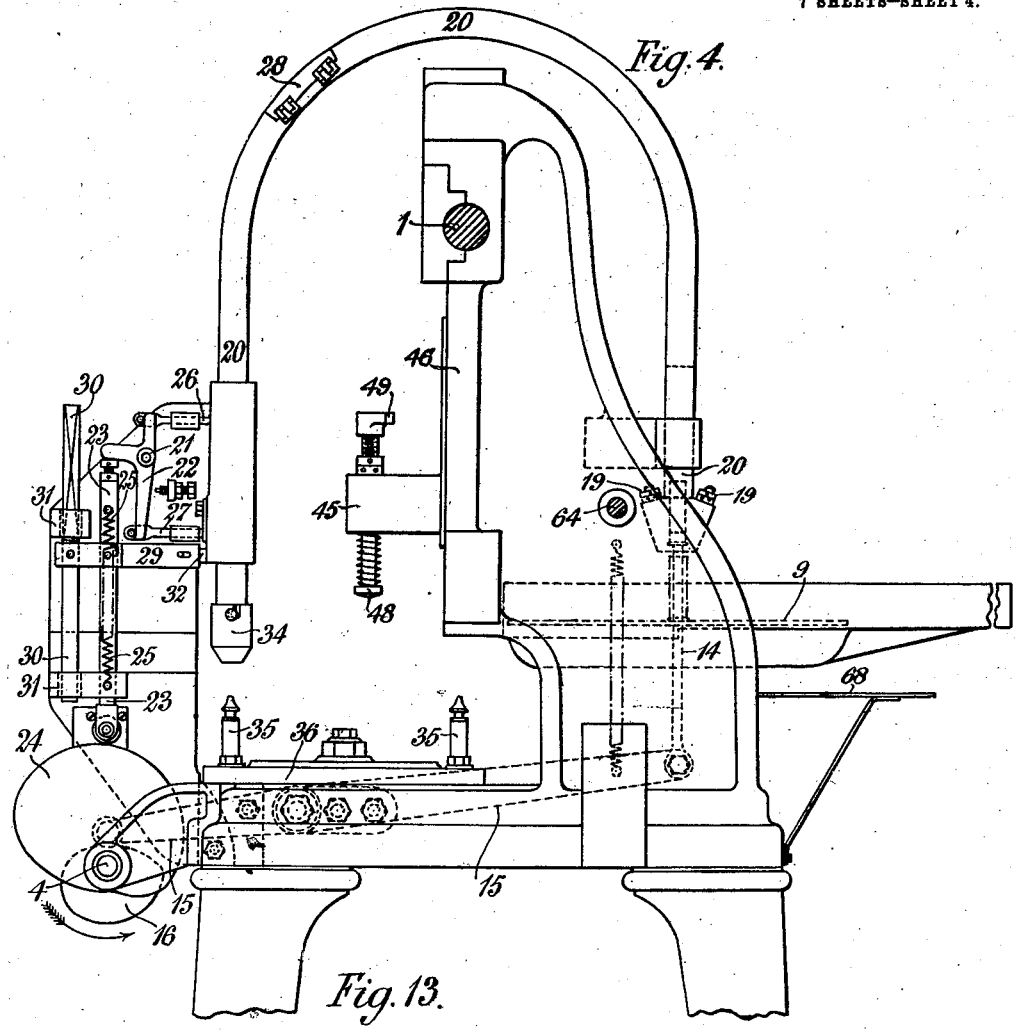
Figure 13:
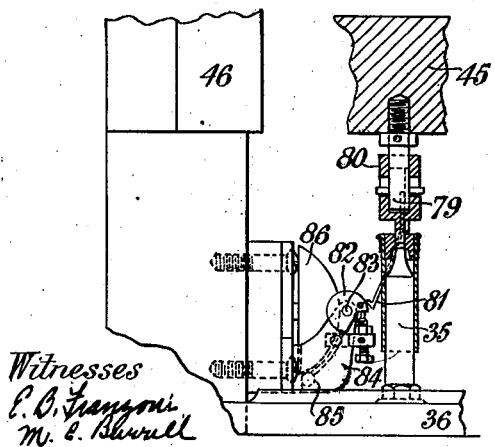
Figure 14:
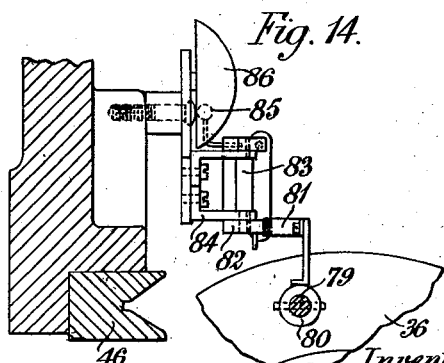

Figure 1 is a plan, Fig. 2 a front elevation, Fig. 3 a left hand elevation with certain parts removed, and Fig. 4 a right hand elevation, certain parts being omitted from the various views in order not to obscure the drawings. Fig. 5 is a vertical section to a larger scale on the line A—A, Fig. 1, looking from the front, Fig. 6 is a vertical section on the line B—B looking from the right. Figs. 7 to 9 show details. Figs. 10, 11 and 12 are detail views of the mechanism for feeding the primers or caps. Figs. 13 and 14 show mechanism for giving an alarm should a primer not have been inserted and Figs. 15 and 16 are detail views of mechanism for pushing the primer home into its place.

The machine is of the type in which the shells are placed upon pins standing up from a table to which a step by step movement of rotation is imparted and by this movement the shells are brought beneath a series of tools carried by a vertically reciprocated tool holder.

1 is the main shaft provided with a belt pulley 2 and driving by chain wheels 3 a shaft 4 which drives through bevel gear 5 a shaft 6 on which is a worm 7 meshing with a worm wheel 8 on the spindle of a disk 9 by which shells placed head downward on the fixed table 10 and pushed from that table by hand onto the disk are fed into a guideway 11 at the mouth of which is an agitating wheel 12 driven by a belt 13 from the spindle of the disk 9. The shells are thus brought over a push rod 14 which is pivoted to one end of a lever 15 rocked by a cam 16 on the shaft 4 and is thus caused to rise up through a fixed guide 17 and through slots 18 cut in the disk 9 and to push the shells upward until their heads are caught as seen in Fig. 5 by two gravity catches 19 capable of being pushed up relative to the end of a pipe 20. As the cartridge shell rises its rim lifts the catches and thus separates them sufficiently to allow the rim to pass, they then drop back behind the rim and support the shell. As the rod 14 rises next time the shell lifted by it pushes the first shell forward along the pipe 20 which thus becomes full of shells. The pipe is bent over to form an arch as most clearly shown in Fig. 4 and when the shells have passed the top of the arch they fall open end first down the front of the pipe in which is a device shown clearly in Fig. 6 for releasing the shells one at a time. Pivoted to the framing of the machine at 21 is a three armed lever 22 which is rocked on its pivot by a rising and falling rod 23 actuated by a cam 24 on the shaft 4, to which cam the rod is held down by a spring 25. As the lever 22 rocks it withdraws alternately against suitable springs two fingers 26 and 27 which project into the pipe 20 one beneath the rims of the cartridge shells and the other beneath the open ends of the shells which are thus allowed to pass the lower finger 27 one by one at proper intervals of time.

A door 28 is provided in the arch (see Fig. 4) by which shells may be inserted into or withdrawn from the pipe if desired.

Attached to the rod 23 is a push down bar 29 to which is secured also a rod 30 moving in guides 31 and thus steadying the movements of the rod 23 and the bar 29. This bar carries a spring influenced finger 32 beveled as shown in Fig. 6 so that as the rods and bar are lifted by the cam 24, the finger comes against a fixed incline 33 (see Fig. 6) and is pushed back by it slightly into the bar so as to clear the rim of the cartridge. As however the rod 23 is brought down again by the spring 25, the finger bears on the head of the cartridge beneath it and pushes it down through a die 34 on to one of a series of pins 35 standing up from the surface of a horizontal table 36. Should the rim of the cartridge be so large that it will not pass readily through the die, the spring 25 yields and the cartridge is not pushed down onto the pin.

The table is rotated step by step anticlockwise by means of a crank pin 37 on the shaft 1 engaging a slot 38 in a lever 39 (see Fig. 3) pivoted at 40 and having its lower end connected by a link 41 to a slide 42 to which is pivoted a pawl 43 taking into teeth 44 cut on the periphery of the table. For the first three steps of the table the shell is not acted upon but at the fourth step it comes beneath the tool holder 45 which is moved up and down in fixed guides 46 by a crank 47 on the main shaft. The tool holder carries a spring plunger 48 which is shown in detail in Fig. 7 and can slide in the holder. Should the shell not have been pushed right home on its pin, this plunger will push it home, but should there by reason of any failure in the supply of shells or of a head having stuck in the die, be no shell on the pin, the plunger will descend so far that a finger 49 upon it will contact with a quadrant 50 and turn it on its pivot 51 (see Figs. 2 and 8) thus pushing in a pin 52 which in turn pushes a lever 53 toward the right against a spring stop 54. This movement brings the lever 53 from beneath a fixed shoulder 55 and it is then free to rock about its pivot 56. Connected to this lever is a link 57 constantly pulled upward by a spring 58; thus when there is no shell on a pin this link rises and moves an incline 59 into the path of a projection 60 carried by the main shaft 1 and so disengages a clutch (not shown) and stops the machine. Nothing happens at the next step but two steps bring the shell beneath a tool 61 seen in Fig. 9 which clears the hole in the front of the cap chamber. The shell is here held down by a fixed plate 62 which prevents it being drawn up its pin by the tool 61 as it rises. At the next position of rest of the shell whose course we are following the primer or cap is inserted part of the way into its cap chamber. A rope drive 63 (see Fig. 1) from the shaft 1 rotates a spindle 64 which by bevel gear rotates a vertical spindle 65 from which again a rope 66 conveys motion to a disk 67 on to which primers are pushed head down from a fixed table 68. The rotation of this disk carries the primers into a guideway 69 at the end of which a bell crank 70 on a fixed pivot 71 pushes a primer radially outward each time it is turned on its pivot by an incline 72 on the tool holder, see Figs. 8, 10 and 11. This bell crank pushes the primer in between two fingers 73 pivoted to a spindle 74 and having their tips kept together by a light spring 75 which surrounds them. The spindle 74 is rocked through 180° by means of a vertical rack 76 on the tool holder gearing with a pinion 77 on the spindle. As therefore the rack descends the spindle 74 is rocked and the fingers 73 are turned over and bring the primer which they are holding over the cap chamber in the head of the shell and a punch 78 on the tool holder pushes the primer out of the fingers 73 and slightly into the cap chamber as shown in Fig. 12. At the next position of rest there is an alarm which is rung should a primer not have been placed in the shell. This is shown in Figs. 13 and 14. A stem 79 on the holder carries a sleeve 80 which is capable of a small vertical movement on its stem and which has upon it a hook 81. When there is a primer in the shell, the primer prevents the sleeve and therefore the hook from descending lower than the positions in which they are shown in Fig. 13 but if there is no primer in a shell then the descent of the sleeve will not be stopped and the hook will descend so far as to engage beneath a shoulder on a disk 82 on a spindle 83 mounted in a bracket 84 and having on it a hammer 85 adapted to strike a bell 86 and so to attract the attention of the operator. At the next position of rest the primer is pushed home into the cap chamber as shown in Figs. 15 and 16. On the shaft 1 is a cam 87 which rocks a spring influenced arm 88 fast on a rock shaft 89 turning in a fixed bearing and having fast on it a short arm 90 which presses down a spring plunger 91 the lower end of which thus pushes the primer home into the cap chamber. The result of this mechanism is that the primer is pushed with a very slow movement and so the risk of firing it is reduced to a minimum. At the next stop the shell is picked off its pin by gravity catches 92 similar to those 19 already referred to and is pushed by the following shell up a pipe 93 by which it is led to any convenient receptacle.

Should this pick off mechanism have failed to act, the shell which has been left on the pin lifts a rod 94 capable of sliding in the tool holder and this rod rocks a lever 95 pivoted on the holder and the other end of this lever comes against the quadrant 50 and actuates the trip mechanism to stop the machine as already described.

What I claim is:—

1. In a cartridge making machine, the combination of an arched pipe having two vertical portions, a catch at the bottom of one portion adapted to retain shells pushed past it into the pipe, a die at the bottom of the second portion, a pusher adapted to push the shells through the die and means for moving the pusher up and down the second portion.

2. In a cartridge making machine, the combination of an arched pipe having two vertical portions, a catch at the bottom of one portion adapted to retain shells pushed past it into the pipe, a device in the second portion adapted to release the shells one by one as they fall down the second portion, a die at the bottom of the second portion, a pusher adapted to push the shells through the die and means for moving the pusher up and down the second portion.

3. In a cartridge making machine, the combination of an arched pipe having two vertical portions, a catch at the bottom of one portion adapted to retain shells pushed past it into the pipe, a die at the bottom of the other portion, a step by step rotating table, pins on the table, and means for pushing the shells through the die onto the pins.

4. In a cartridge making machine, the combination of an arched pipe having two vertical portions, a catch at the bottom of one portion adapted to retain shells pushed past it into the pipe, a die at the bottom of the second portion and a spring actuated bar protruding into the second portion and adapted to push the shells through the die.

HOWARD DOUGLAS HODGE.

Witnesses:
O. J. WORTH,
C. P. LIDDON.